United States Patent

Starr

[15] 3,661,324
[45] May 9, 1972

[54] TEMPERATURE SENSOR FOR SPACE SUIT

[72] Inventor: James B. Starr, St. Paul, Minn.

[73] Assignee: The United States of America as represented by the Secretary of the Navy

[22] Filed: Dec. 10, 1970

[21] Appl. No.: 96,874

[52] U.S. Cl. ................................ 236/98, 73/368, 184/1 R, 251/355
[51] Int. Cl. ........................................................ G05d 23/02
[58] Field of Search ............... 73/368, 37.6; 236/98; 165/46; 128/1 A; 184/1 R; 251/57, 61, 11, 355; 137/237

[56] References Cited

UNITED STATES PATENTS

| | | |
|---|---|---|
| 3,593,917 | 7/1971 | Buisson.................................236/98 |
| 2,836,367 | 5/1958 | Stahl.......................................236/98 |
| 3,071,128 | 1/1963 | Cramer...................................128/1 A |
| 3,000,616 | 9/1961 | Spangler.................................165/46 |

*Primary Examiner*—Louis R. Prince
*Assistant Examiner*—Daniel M. Yasich
*Attorney*—R. S. Sciascia, H. H. Losche and Paul S. Collignon

[57] ABSTRACT

A temperature sensor having a liquid-filled temperature bulb for actuating a diaphragm which positions a hollow cylindrical valve plug. The hollow cylindrical valve plug is provided with an open end and a closed end having a small orifice therein whereby fluid flowing into said hollow cylindrical valve plug and out of said orifice provides a film of fluid between the closed end of the valve plug and the diaphragm thereby reducing sliding friction between the valve plug and the diaphragm.

3 Claims, 2 Drawing Figures

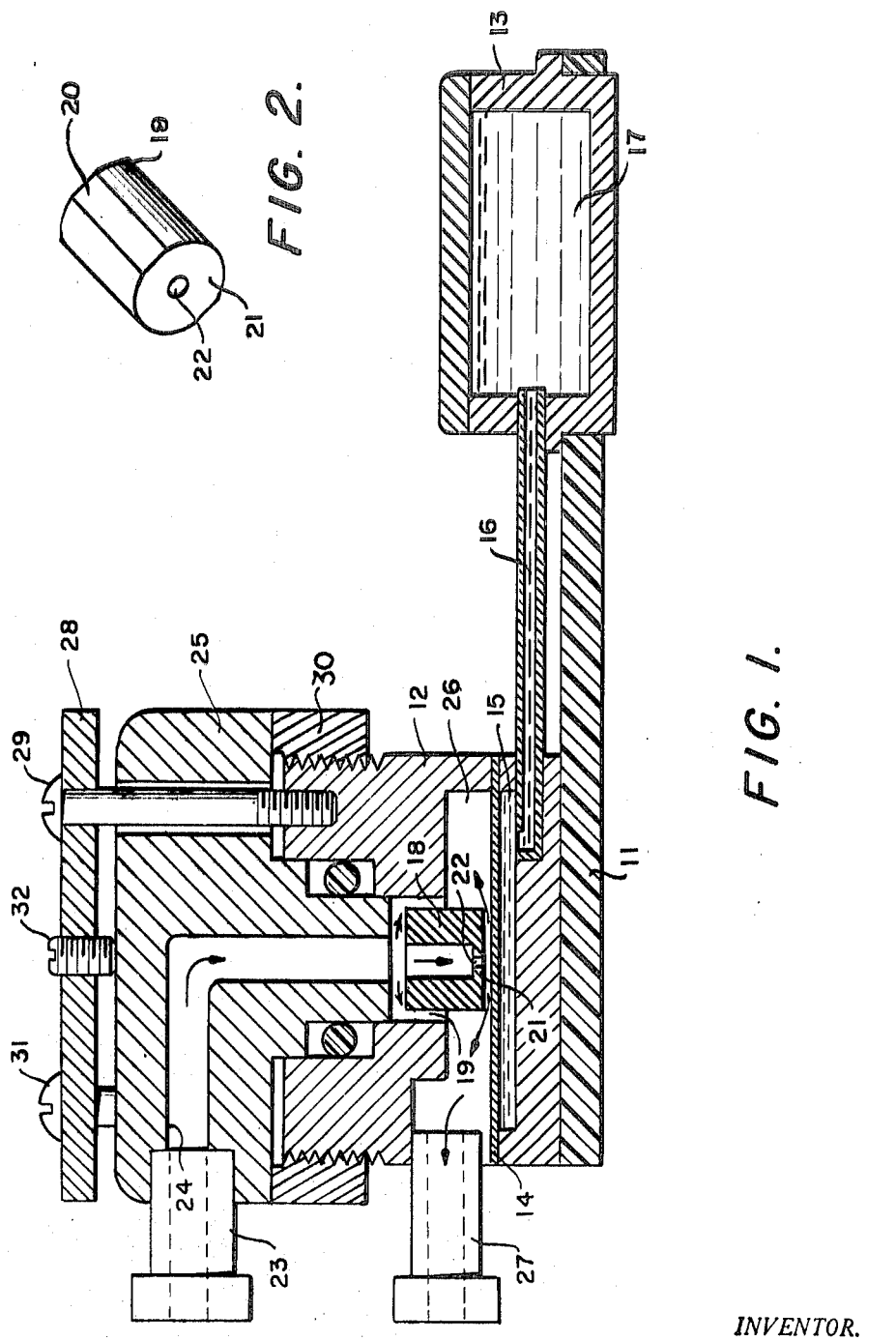

TEMPERATURE SENSOR FOR SPACE SUIT

CROSS-REFERENCE TO RELATED APPLICATION

Patent application of James B. Starr entitled, "Comfort Control System For Space Suit", Ser. No. 92,622, filed Nov. 25, 1970.

BACKGROUND OF THE INVENTION

The present invention relates to a temperature sensor and particularly to a temperature sensor for use in a control system for a liquid cooled garment.

The function of a control system for a liquid cooled garment is to maintain a comfortable thermal state for the person wearing the garment, and this function is automatic when the control system is able to sense some index of the person's thermal state and then modulate the temperature of cooling water flowing through passageway in said garment in response to changes in that index. A number of indexes can be used to measure the thermal state of a subject. For example, oxygen consumption, heat rate, and respiratory rate indicate, with varied degrees of accuracy, the rate of metabolic heat generation. While rectal, tympanic-membrane and skin temperatures indicate heat storage, skin temperature is considered the most practical index of a person's thermal state in automatic temperature control systems for space suits.

The use of a temperature sensing bulb having fluid which expands and contracts with changes in temperature is well known. For example, in U. S. Pat. No. 3,358,494, entitled, "Calibrated Control Device and Method", which issued Dec. 19, 1967, to Hugh J. Tyler and Denis G. Wolfe, there is shown a valve member which is movable by a condition responsive means connected to a temperature sensing bulb by a conduit means.

Whenever it is desired to maintain temperature to very close tolerances, the friction between a movable valve member and a condition responsive means, such as a diaphragm, becomes important as a hysteresis effect occurs. In order to reduce the amount of friction between a movable valve member and a diaphragm, a ball is frequently used as the movable valve member, however, frequently oscillations of the ball will occur and these cause a shift in sensor calibration.

SUMMARY OF THE INVENTION

The present invention relates to a temperature sensor for a space suit. The sensor has a liquid-filled temperature bulb and the liquid expands and contracts with changes of body temperature. A diaphragm is provided within a valve housing and is actuated by the liquid. A valve plug is movable by the diaphragm and the valve plug is hollow with an open end and a closed end which has an orifice therein. Fluid entering the valve plug exits through the orifice to provide a film of fluid between the closed end of the valve plug and the diaphragm, thereby reducing sliding friction between the valve plug and the diaphragm.

BRIEF DESCRIPTION OF THE DRAWING

FIG. 1 is a sectional view showing a preferred embodiment of the present invention; and FIG. 2 is a perspective view of a valve plug.

DESCRIPTION OF THE PREFERRED EMBODIMENT

Referring now to FIG. 1 of the drawing, there is shown a base 11 to which a valve housing 12 and temperature sensing bulb 13 are attached. A thin diaphragm 14, which is responsive to changes in fluid pressure, is provided in valve housing 12 to provide a fluid compartment 15. A passageway 16 connects bulb 13 and fluid compartment 15, and fluid 17 is provided in bulb 13, compartment 15 and passageway 16. A valve plug 18 is positioned in a bore 19 in valve housing 12 and valve plug 18 essentially fills bore 19.

As shown in FIGS. 1 and 2 of the drawing, valve plug 18 is a hollow cylinder which has an open end and a closed end 21. Flats 20 are provided on the periphery of valve plug 18 to allow fluid to flow down and around valve plug 18. An orifice 22 is provided in the center of closed end 21. An inlet connection 23 is provided for a passageway 24 in upper housing 25 which is attached to valve housing 12 by screws 29 and 31, which engage band 28. A nut 30, which threadedly attaches to valve housing 12, is provided to vertically position upper housing 25 relative to valve housing 12. Passageway 24 carries fluid and, as seen in FIG. 1, a portion of this fluid can pass into hollow cylindrical valve plug 18 and out through orifice 22 to provide a film of fluid between closed end 21 of plug 18 and diaphragm 14. The portion of fluid leaving passageway 24 and not entering into valve plug 18 passes into chamber 26 and out through connection 27.

Changes in flow resistance depends on the gap between the lower surface of upper housing 25 and the upper surface of valve plug 18. Upper housing 25 can be vertically adjusted relative to valve housing 12. Set screw 32, which threadedly engages with band 28, is first loosened, and then nut 30 is turned in a desired direction to either increase or decrease the gap between the lower surface of upper housing 25 and the upper surface of valve plug 18. After the adjustment is made, set screw 32 is tightened against upper housing 25, and the resulting pressure applied by upper housing 25 against nut 30, locks nut 30 in place. This arrangement facilitates extremely small adjustments in valve flow area so that a desired flow resistance can be obtained at a specified skin temperature.

In operation, the toluene-filled temperature bulb 13 is placed on the skin of a person and a rise in that person's temperature causes the toluene to expand thereby displacing diaphragm 14. Disphragm 14, in turn, moves valve plug 18 toward passageway 24 thereby decreasing the valve opening. Likewise, with a decrease in body temperature, the toluene in bulb 13 contracts and diaphragm 14 and valve plug 18 reacts to increase the valve opening. Thus it can be seen that flow of fluid through passageway 24 and into chamber 26 and then out through connection 27 is regulated by temperature bulb 13. A portion of the fluid from passageway 24 enters into valve plug 18 and passes outwardly through orifice 22 to provide a film of fluid between the closed end 21 of valve plug 18 and diaphragm 14, thereby reducing sliding friction between valve plug 18 and diaphragm 14.

I claim:

1. A temperature sensor for a space suit comprising,
   a valve housing having an inner chamber with an inlet passageway and an outlet passageway communicating with said inner chamber,
   pressure responsive means in said inner chamber,
   a hollow cylindrical valve plug in said inner chamber for regulating the amount of flow of fluid through said inlet passageway into said inner chamber, said hollow cylindrical valve plug having an open end adjacent said inlet and a closed end with a small orifice therein adjacent said pressure responsive means whereby fluid flows into said hollow cylindrical valve and through said orifice to provide a film of fluid between said closed end of said hollow cylindrical valve plug and said pressure responsive means,
   means for adjusting the distance between the end of said inlet passageway communicating with said inner chamber and said pressure responsive means, and
   temperature sensing means for actuating said pressure responsive means to actuate said valve plug whereby the valve plug will move therewith.

2. A temperature sensor for a space suit as set forth in claim 1 wherein means for adjusting the distance between the end of said inlet passageway communicating with said inner chamber and said pressure responsive means comprises threaded means for spacing the end of said inlet passageway communicating with said inner chamber relative to said pressure responsive means.

3. A temperature sensor for a space suit as set forth in claim 1 wherein said temperature sensing means comprises a temperature sensing bulb filled with toluene.

* * * * *